US011873118B2

(12) United States Patent
Gellerson et al.

(10) Patent No.: US 11,873,118 B2
(45) Date of Patent: Jan. 16, 2024

(54) SYSTEM AND METHOD FOR IMPROVED CYCLE TIME MILLING AND INSPECTION

(71) Applicant: Pacific Propeller International, LLC, Kent, WA (US)

(72) Inventors: Timothy Guy Gellerson, Des Moines, WA (US); Clinton Edward Motley, Renton, WA (US); Jeremy Daniel Hall, Federal Way, WA (US); Leah Johanna Graff, Puyallup, WA (US); Roger Allen Eckenroth, Puyallup, WA (US); Brian Wilford Riffle, Auburn, WA (US)

( * ) Notice: Subject to any disclaimer, the term of this patent is extended or adjusted under 35 U.S.C. 154(b) by 8 days.

(21) Appl. No.: 17/243,375

(22) Filed: Apr. 28, 2021

(65) Prior Publication Data

US 2021/0380282 A1 Dec. 9, 2021

Related U.S. Application Data

(60) Provisional application No. 63/034,966, filed on Jun. 4, 2020.

(30) Foreign Application Priority Data

Oct. 30, 2020 (FR) .................................. FR2011148

(51) Int. Cl.
*B64F 5/60* (2017.01)
*B64F 5/40* (2017.01)
(Continued)

(52) U.S. Cl.
CPC .................. *B64F 5/60* (2017.01); *B23P 6/00* (2013.01); *B64F 5/40* (2017.01); *G01M 1/34* (2013.01);
(Continued)

(58) Field of Classification Search
CPC ................... B23P 6/00; B27P 2700/01; Y10T 29/49336–49339; Y10T 29/49318;
(Continued)

(56) References Cited

U.S. PATENT DOCUMENTS 2,308,344 A * 1/1943 Andrake .................. B21K 3/04
29/889.61
2,541,661 A * 2/1951 Palmatier ............... B64D 15/02
416/233
(Continued)

FOREIGN PATENT DOCUMENTS

DE 19762648963 5/1978
WO WO-2003064089 A1 8/2003
WO WO-2016163408 A1 10/2016

*Primary Examiner* — Jason L Vaughan (57) ABSTRACT

This invention relates to both process and tooling for machining exemplary Hamilton Sundstrand 7111 and 7121 aircraft propeller blade taper bores, or equivalent to comply with government and or industry standards or specifications for such refurbishment. The tooling and process invented are an Improvement over previous and current taper bore machining methods in improved repeatability and cost effectiveness, as this machining method can quickly and repeatedly machine propeller blades to meet fit, form, and function requirements. The process makes use of a specially constructed horizontal mill, specially constructed blade-holding fixture, specially constructed probing system, specially constructed reamers, and specially constructed air gauges. A blade holding fixture assembly including a base plate, a blade holding fixture and a blade alignment fixture hold an aircraft propeller blade in a horizontal milling machine for refurbishment of the taper bores. Refurbishment includes reaming shot peened surfaces, testing the reamed surfaces with an air gauge and a fluorescent penetrant emersion fixture.

9 Claims, 13 Drawing Sheets

(51) Int. Cl.
  *G01M 1/34*    (2006.01)
  *G01N 27/90*   (2021.01)
  *G01N 21/91*   (2006.01)
  *B23P 6/00*    (2006.01)
  *G01M 5/00*    (2006.01)
  *G01N 21/88*   (2006.01)

(52) U.S. Cl.
  CPC .......... *G01M 5/0016* (2013.01); *G01N 21/91* (2013.01); *G01N 27/90* (2013.01); *G01N 21/8803* (2013.01)

(58) Field of Classification Search
  CPC .. Y10T 29/49721–49726; G01B 13/10; G10B 21/14; B64F 5/60; B64F 5/40; B64C 11/02–28; B64C 27/47
  See application file for complete search history.

(56) References Cited

U.S. PATENT DOCUMENTS

| | | | | |
|---|---|---|---|---|
| 5,314,309 | A * | 5/1994 | Blakeley | B29C 70/46 416/241 A |
| 5,660,527 | A * | 8/1997 | Deering | F03D 1/0658 416/204 R |
| 8,882,464 | B2 * | 11/2014 | Smith | B64C 11/24 416/145 |
| 2013/0165024 | A1 | 6/2013 | Araujo et al. | |
| 2018/0093782 | A1 | 4/2018 | Lofstrom et al. | |

\* cited by examiner

SYSTEM AND METHOD FOR IMPROVED CYCLE TIME MILLING AND INSPECTION

TECHNICAL FIELD

This description relates generally to repair and refurbishment of aircraft parts and more specifically to repair and refurbishment of aircraft propellers.

BACKGROUND

An aircraft propeller produces thrust to drive an airplane. The propeller typically converts rotary motion from an aircraft engine into a swirling slipstream of air which pushes the aircraft typically forward through the air. A propeller typically includes a hub, to which radial blades of a fixed or variable pitch may be attached. The entire propeller typically rotates about the longitudinal axis of the engine to which it is coupled. Through gearing or other mechanical mechanisms the pitch of the radial blades may be fixed, manually variable, automatically variable, or the like.

Propellers may be used at subsonic airspeeds, as at higher speeds when the blade speed approaches the speed of sound drag, noise and propeller structural problems may be created. Even at typical operating speeds, balance and integrity of propeller must be maintained to prevent failure. Also, under typical operating conditions a propeller is subject to mechanical stresses that can produce cracking, fatigue or the like in the propeller, which can lead to catastrophic failure of the propeller that can even lead to the loss or the aircraft. Proactive testing and rework may be used to help prevent propeller failure.

As a part of aircraft maintenance, testing and rework may be performed on various aircraft parts and systems in an attempt to detect parts that may soon fail, or have accumulated enough use to be deemed ready for maintenance. However, such testing efforts though tending to improve aircraft reliability, tend to increase overall aircraft maintenance costs, and increase parts inventory as parts being tested must be replaces with ones taken from a spare parts inventory.

Time in maintenance, and the operations performed also tend to increase maintenance costs of an aircraft. At any given time a certain percentage of parts may be removed or switched out of the operation to be subjected to maintenance and testing. Before the part can be again be deemed suitable for use in service they might also have to be reworked or refurbished as a result of the testing, or as a general practice. Such testing and rework procedures tend to take parts out of use further increasing maintenance costs. It may be desired to be able to test parts with speed, improved accuracy and lowered cost to improve overall maintenance costs. Accordingly it is desirable to continue to provide improved systems and methods of testing and maintaining aircraft parts such as propellers.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for accurate and economical refurbishment of aircraft propellers to comply with government and or industry standards or specifications for such refurbishment. An overall process to achieve the results required is provided as well as that of machinery, tooling and fixturing specially constructed to achieve the specified results. A blade holding fixture assembly including a base plate, a blade holding fixture and a blade alignment fixture hold an aircraft propeller blade in a horizontal milling machine for refurbishment of the taper bores. Refurbishments includes reaming shot peened surfaces, testing the reamed surfaces with an air gauge and a fluorescent penetrant emersion fixture.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a system and method of aircraft propeller taper bore reaming (Precision Taper-Bore Reaming). Although the present examples are described and illustrated herein as being implemented in a variable pitch propeller refurbishment system, the system described is provided as an example and not a limitation. As those skilled in the art will appreciate, the present examples are suitable for application in a variety of different types of propeller refurbishment systems.

Propeller blades may include a long axial bore to aid in centering the blade when it is mounted on an aircraft engine. To aid centering the bore may be tapered ("taper bore"). Propeller blades may be aluminum alloy, or other light material, and accordingly may include bushings or the like at attachment points to provide structural strength for the blade by distributing the forces of attaching fasteners away from a single point on the blade. Also, the taper bore surface may be shot peened. In shot peening the mechanical change of the metal surface (by the dimpling of the surface produced by hitting it with hard round objects, that is peening) produces compressive residual stresses and crack initiation may be prevented or slowed. Environmental exposure during use of the propeller may cause pitting corrosion on the taper bore surface. To prevent failure rework of the taper bore surface may be called for. Pitting sites may initiate stress corrosion cracking, fatigue cracking or the like. Accordingly renewing the taper bore surface is called for.

Shot peening and reaming may be performed as part of the maintenance process of a propeller's taper bore. Shot peening produces a dimpled surface which may also include reaming of the bore to reduce surface roughness and improve contact with the bore surface when the blade is mounted. Such a surface may be removed so that inspection may be performed, and then renewed prior to putting the blade back into service if it passes inspection.

Figure 1:
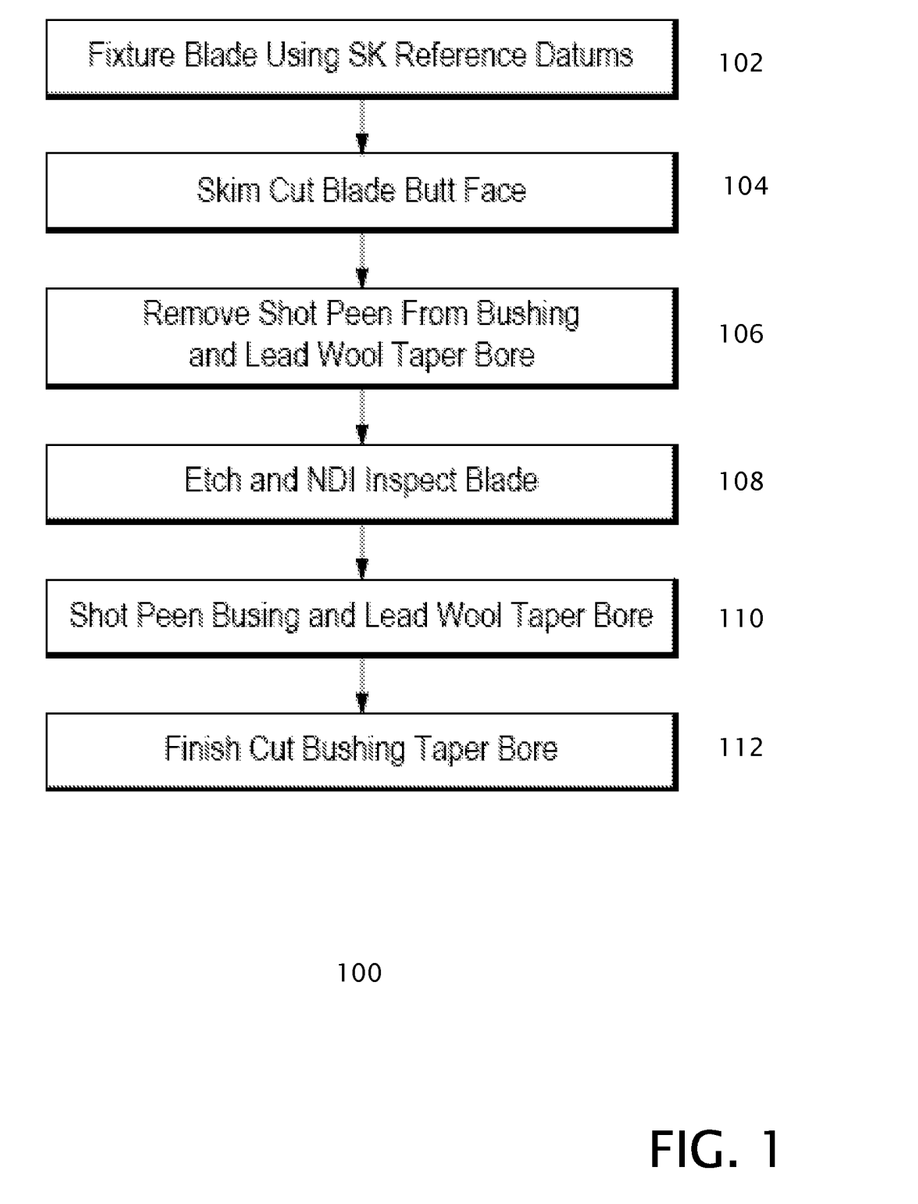
FIG. 1 shows generalized Hamilton Standard SK propeller repair process.

FIG. 1 shows generalized Hamilton Standard SK propeller repair process 100. In 2017, a KC-130T Hercules aircraft crashed in Mississippi due to a propeller blade departing the aircraft inflight. The ensuing crash investigation revealed that Hamilton Sundstrand ("HS") 7111 and 7121 propeller blades are susceptible to crack growth when in a corrosive environment.

Such crack growth in a corrosive environment may be referred to as stress corrosion cracking. To mitigate and reduce risk of failure of in-service propeller blades Hamilton Sundstrand ("HS") in conjunction with the United State Air Force ("USAF") developed new overhaul requirements that require Hamilton Sundstrand 7111 and 7121 propeller blades to be inspected more thoroughly.

The new overhaul requirements are defined and documented on HS drawings SK1005353 and SK1005459 ("SK drawings") and are currently required for future overhauls of propeller blades. In brief the SK drawings typically call for locating the blade at required datum's, removal of existing shot peen in the taper bore of the hub, additional nondestructive inspections ("NDI"), re-shot peening taper bore, and finish cutting the taper bore. In brief the SK drawings, which are typical of such drawings, define a desired condition or specification, but typically leave details of how to carry out the various steps. Alternatively, unique processes may be developed that achieve the same results as outlined in the SK drawings. As will be described below the system and method for precision taper bore reaming that has been developed is a unique departure and improvement over that which is currently known in the art, such as the SK drawings, or the like.

In particular as called out in the SK drawings, the blade is first fixtured utilizing reference datums as provided in the SK drawings 102. Next the butt face of the blade that fits against the airplane is skim cut 104. Now the shot peening surface finish is removed from the lead wool taper bore (202 of FIG. 2), and the bushing taper bore (204 of FIG. 2) of the propeller 106. The blade is then etched and NDI inspected 108, then the shot peening of the bushing and lead wool taper bore is performed 110. Finally finish cutting of the bushing and taper bore is performed 112.

Figure 2:
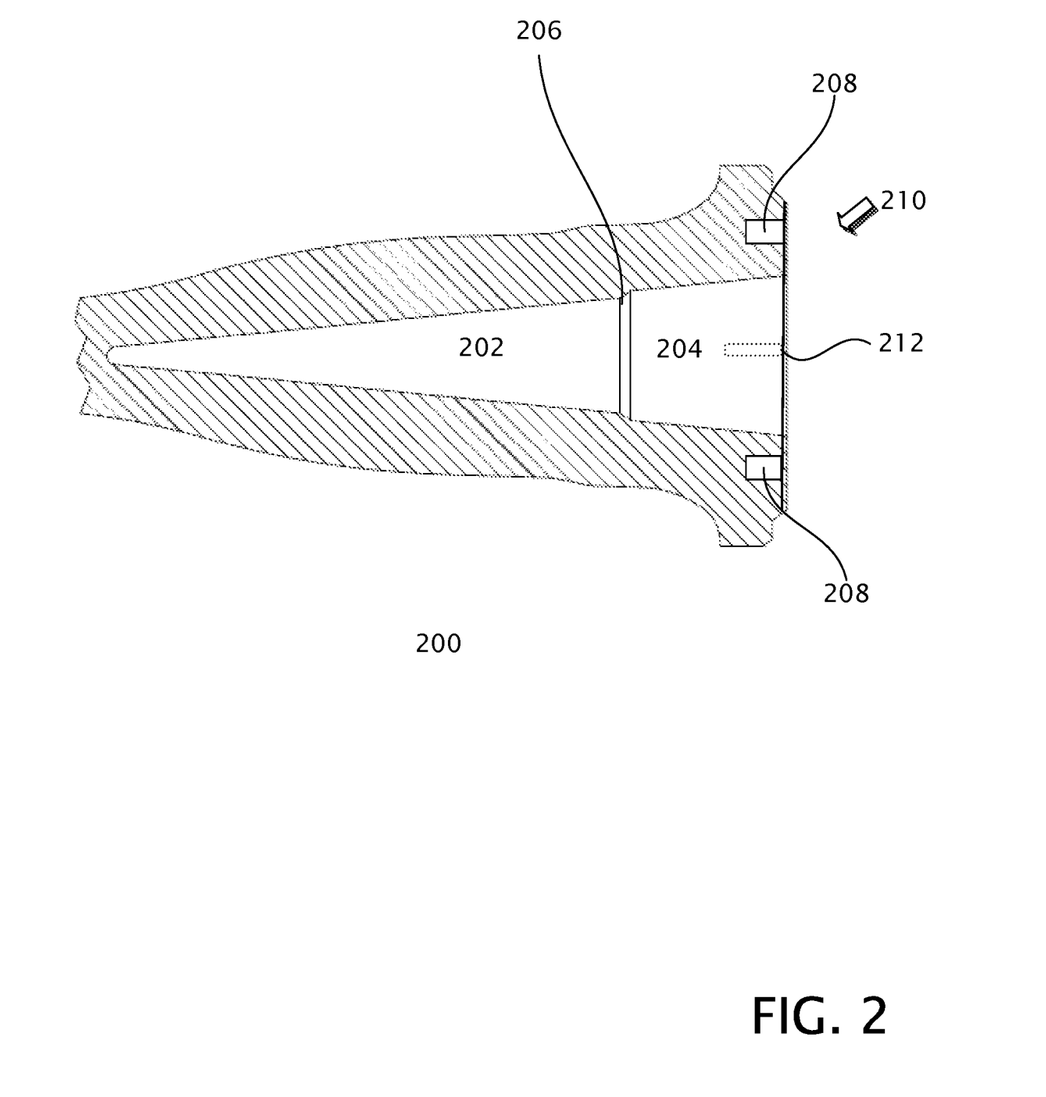
FIG. 2 shows a section view of a propeller taper bore.

FIG. 2 shows a section view of a propeller taper bore 200. Exemplary HS 7111 and 7121 propeller blades have two taper bores: a lead wool taper bore 202 and a bushing taper bore 204. When entering the blade 200 first the bushing taper bore 204 is encountered, then the lead wool taper bore 202. The bushing taper bore 204 typically has a larger diameter than the lead wool taper bore 202, and may include a stepped down region 206 where they meet. The taper bore depicted typically has a rough, matted surface. The process known as shot peening causes the roughed surface. The process is done to put the surface of the taper bore in a compressed state. The compressed state is important in that it helps prevent cracks from forming when blade is loaded in tension. In technical terms, shot peening imparts residual compressive stress in the surface layers of material to prevent stress corrosion cracking from occurring due to fatigue.

The removal of shot peen impressions in the bushing 204 and lead wool taper bore 202 tends to be important. Without removal of the shot peen impressions, it can be difficult to find corrosion pitting in the shot peened surface, as the pitting can blend in with the dimples from shot peen.

The HS SK drawings provide a generalized process flow to ensure the nondestructive inspection is done after removal of shot peen from the taper bore and details the final fit, form, and function the blade taper bore must be in for the repair. However, the HS SK drawing does not give any requirements on the method, techniques, equipment, machining process, tooling, fixtures, programming, and final inspection of the repair. Unfortunately, this document provides little more than overall systems guidance, and it is left to the reader to determine how to implement these guidelines in a production environment. Accordingly the HS SK drawings are more of a specification. It is also worth noting that in such documents fixturing and testing to achieve the guidelines often requires a high degree of ingenuity left to the reader.

Process for Precision Taper Bore Reaming

Figure 3:
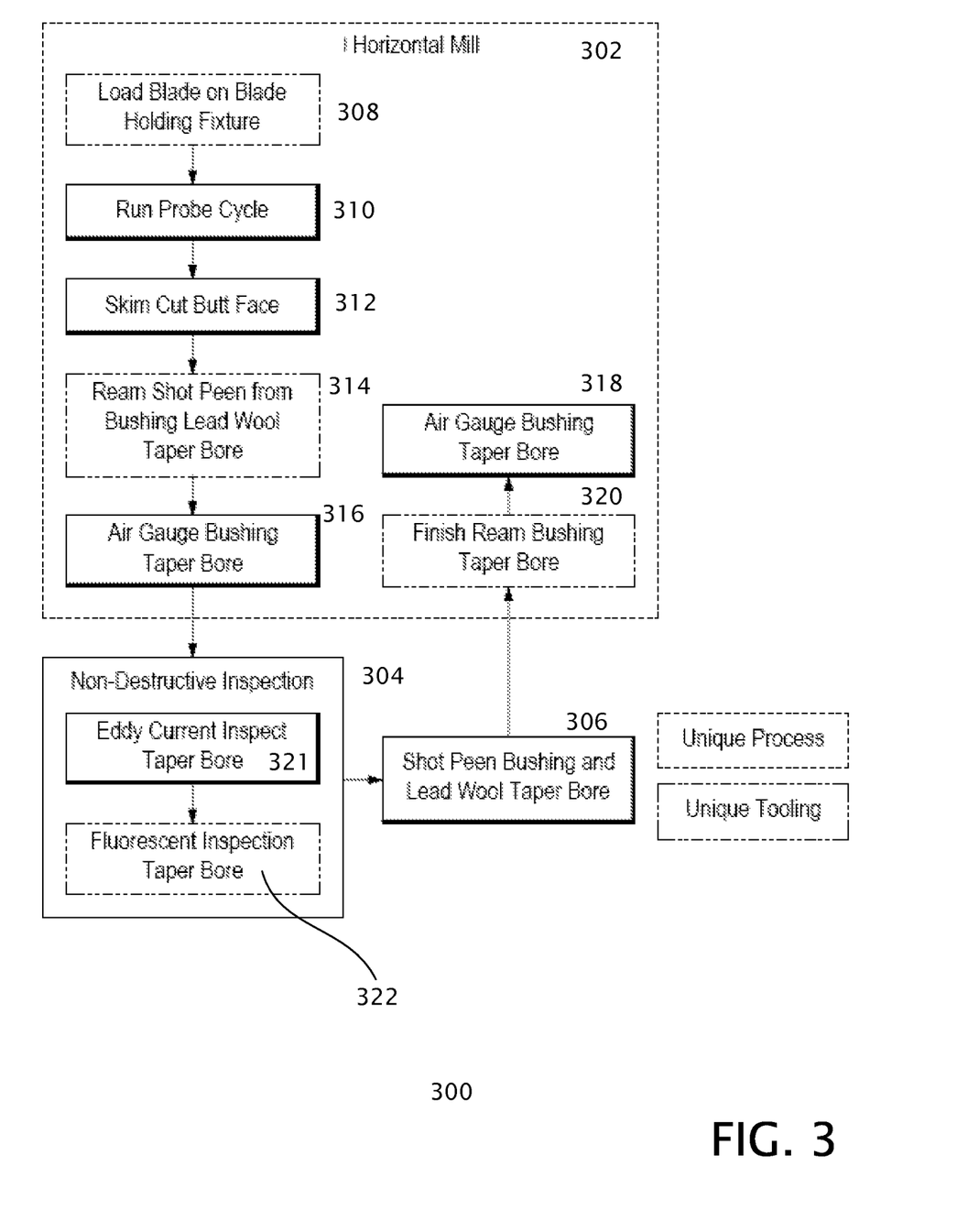
FIG. 3 shows a unique process for precision taper bore reaming.

FIG. 3 shows a unique process for precision taper bore reaming 300. The process 300 solves the problem of machining the bushing and lead wool taper bore repeatedly and quickly to meet HS SK drawing requirements, which tends to be difficult in practice. The system and method of precision taper bore reaming may be used to repair a Hamilton Sundstrand 7111 and Hamilton Sundstrand 7121 blade or the like. Included as part of the process is a unique the invented blade holding fixture (500 of FIG. 5) used to hold and orientate the blade properly, the reamers (1000 of FIG. 10 and 1100 of FIG. 11) used for removal of the shot peen in the taper bores, the NDI tooling to fluorescent penetrant inspect blade taper bore (1300 of FIG. 13), finish reamers, and final inspection tooling. This combined process and tooling tends to allow for the repair of the Hamilton Sundstrand 7111 and 7121 blade taper bores repeatedly and quickly as required by the HS SK drawing requirements.

First in a horizontal mill 302, the blade to be refurbished or repaired is loaded in a blade holding fixture 308. Next a probe cycle is run on the horizontal mill 310. Next the butt face of the propeller is skim cut 312. The shot peening surface treatment in the bushing and lead wool taper bore is next removed by reaming 314. Air gauge bushing of the taper bore is next performed 316.

The propeller is removed from the mill for nondestructive inspection 304. Inspection may include eddy current of the taper bore 321, and fluorescent inspection of the taper bore 322. Upon return of satisfactory results, the bushing taper bore and the lead wool taper bore are shot peened 306 utilizing shot peening techniques known to those skilled in the art.

The part is returned to the horizontal mill 302. There a finish reaming of the bushing taper bore is performed 320. And, finally air gauge bushing of the taper bore 318 is carried out.

Figure 4:
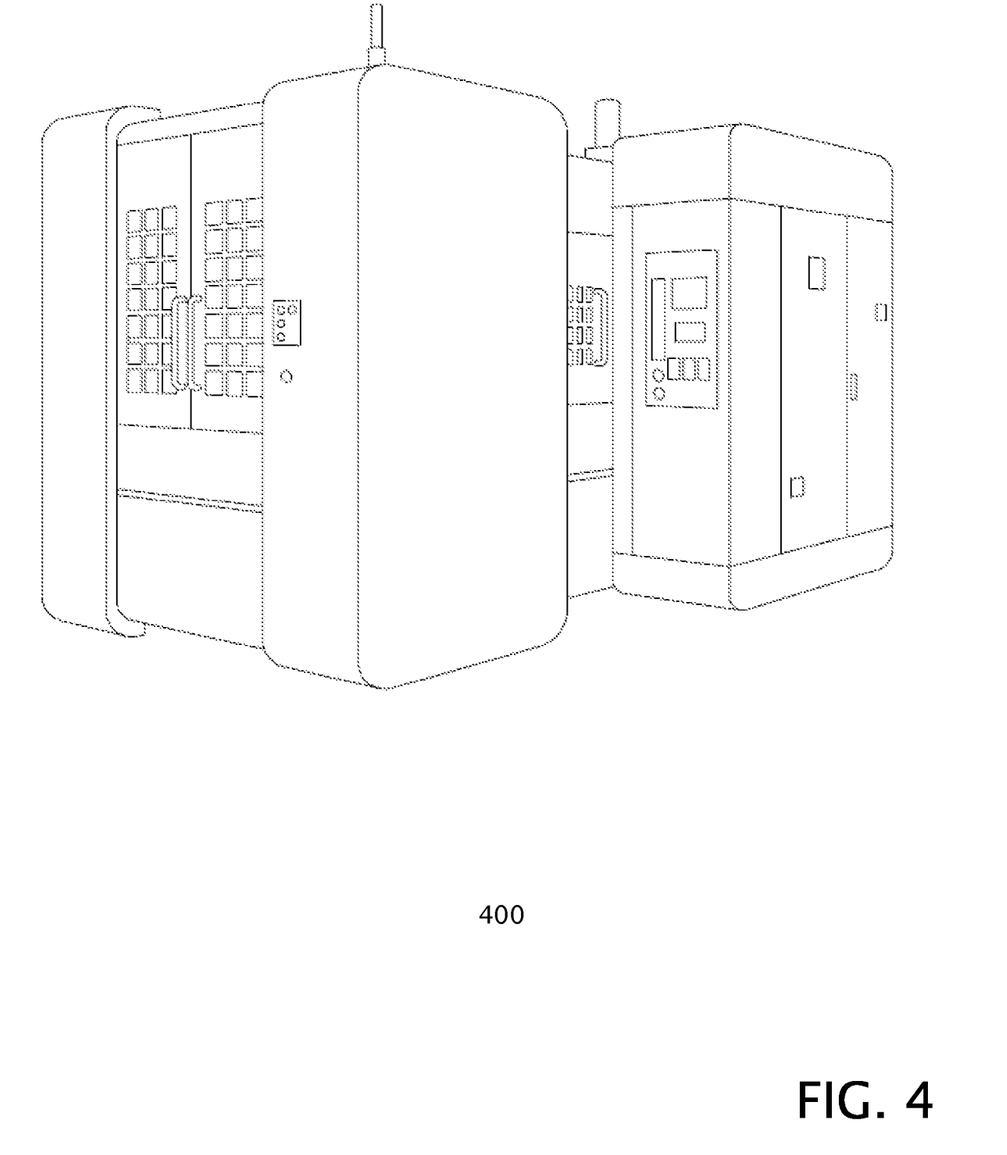
FIG. 4 shows a custom horizontal mill used for precision taper bore reaming.

FIG. 4 shows a custom horizontal mill used for precision taper bore reaming 400. The horizontal mill 400 has been custom built to be used in the system and method of precision taper bore reaming. A horizontal milling machine 400 that can meet the HS SK drawing specifications regarding finish requirements would typically have positional accuracy and repeatability of 0.0 to 0.001±0.0005 inch or less, runout of 0.0 to 0.001 inch, and minimum torque of 300 to 500 ft-lbs to properly ream the taper bore. Any positional inaccuracy or runout on the horizontal machine spindle will stack up with the reamer runout, causing the taper angle of the reamer to be out of tolerance during the air gauge taper inspection. The made to order horizontal mill 400 has a runout of 5 microns, produces 460 ft-lbs of torque, and positional accuracy and repeatability of 0.00008±0.00004 inch. This horizontal mill 400 makes it possible to ream the lead wool taper bore using a single reamer in one operation without stalling, has high degree of positional accuracy and repeatability, and very small amount of runout to consistently produce repeatable reamed taper bore. An exemplary base model horizontal milling machine may be based on an Enshu GE580 Horizontal mill manufactured by Enshu USA corporation located at 404 E. State Parkway, Schaumburg, Ill. 60173.

Blade Holding Fixture Assembly

Figure 5:
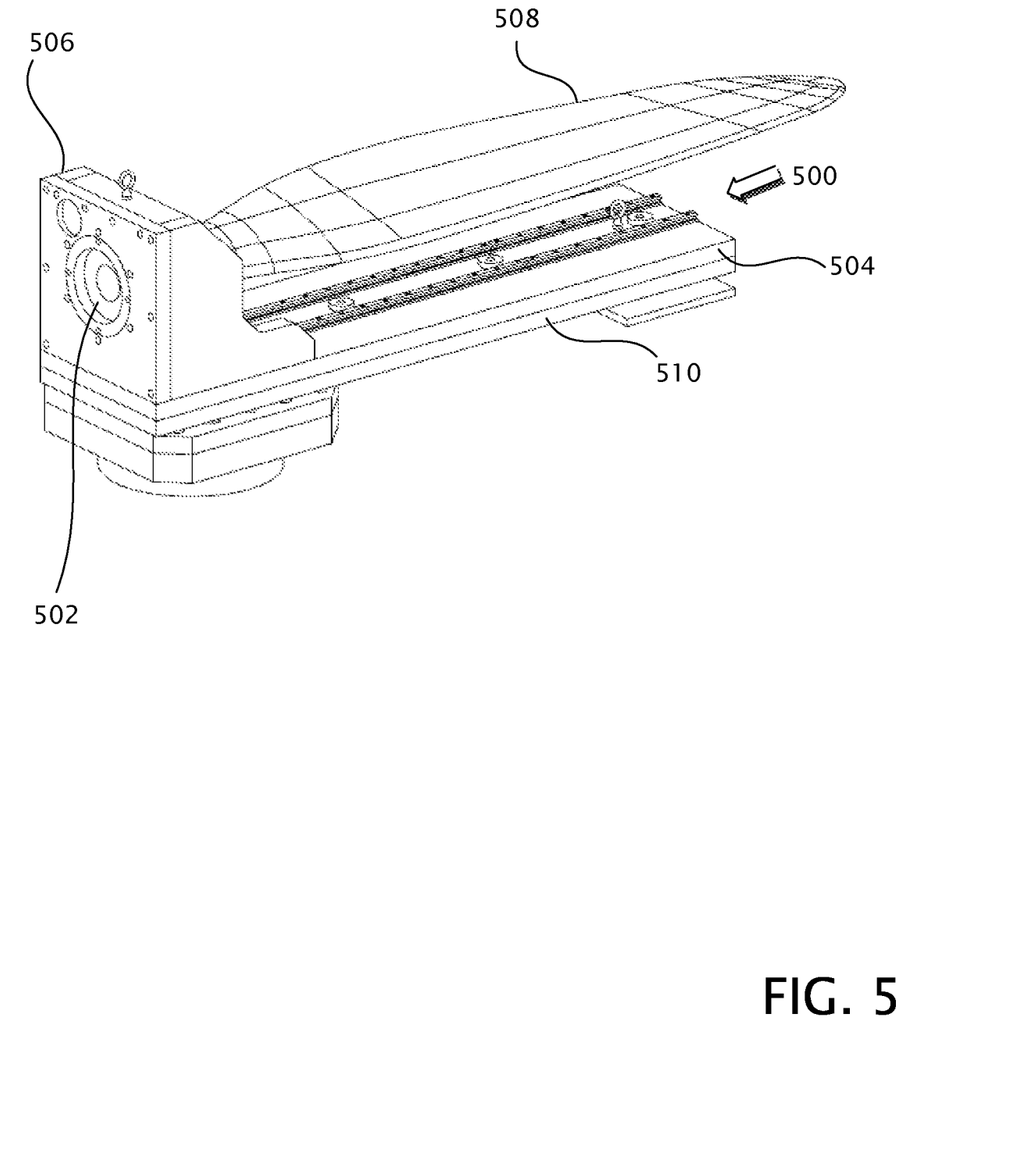
FIG. 5 shows a blade holding fixture assembly used for precision taper bore reaming.
Figure 8:
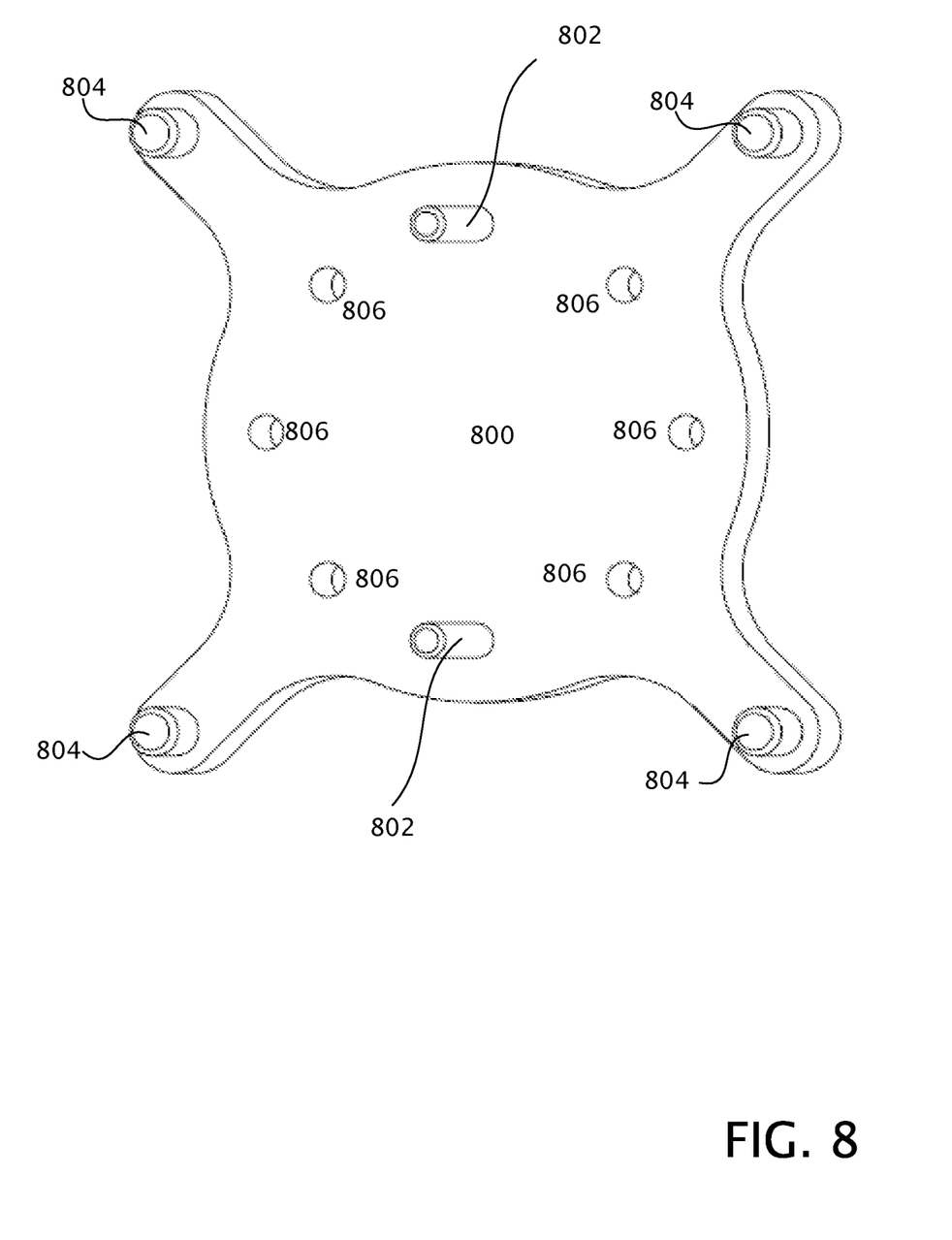
FIG. 8 shows an alignment plate used for precision taper bore reaming.

FIG. 5 shows a blade holding fixture assembly 500 used for precision taper bore reaming. The uniquely designed blade holding fixture assembly 500 is an important part of the invented system and process. The blade holding fixture assembly 500 maintains blade 508 orientation and alignment during taper bore machining and reaming process. This blade fixture can accommodate both a cuffed and non-cuffed type blades. The holding fixture assembly 500 is composed of four principal parts; the base plate fixture 504, blade holding fixture 506, blade adaptor 502, and alignment plate (800 of FIG. 8). The alignment plate is not visible in FIG. 5 but is shown in FIG. 8.

The base plate 504 is typically attached permanently inside of the horizontal milling machine (400 of FIG. 4). The purpose of this base plate 504 is to allow the blade holding fixture 506 to be quickly removed and installed from the horizontal mill (400 of FIG. 4) for a fixture change. The base plate 504 is designed using methods known to those skilled in the art to realign the blade-holding fixture accurately via use of CarrLock® clamps manufactured by Carr Lane Manufacturing Company located at 4200 Carr Lane Ct., St. Louis, Mo. 63119, or equivalent.

The Carr Locke Clamp System allows accurately locating and clamping at the same time, with the turn of a hex wrench. The clamp system allows for mounting quick-change tooling on a sub plate. Each clamp mounting point typically includes typically three components: a Carr Lock® Clamp, with a precisely ground shank; a Carr Lock® Liner Bushing in the top plate; and a Carr Lock® Receiver Bushing in the sub plate. The clamp assembly provides considerable hold down force, together with a repeatability of +/−0.0005 inches.

In alternative examples equivalent locating and clamping systems may be used that engage and locate by turning a clamping screw (not shown) with a wrench (not shown) that advances a large center ball (not shown), pushing a plurality of clamping balls (not shown) outward. These clamping balls engage an angled inside diameter of a receiving bushing (not shown), pulling the entire unit firmly downward. Such a clamping arrangement may be termed a ball lock clamp ("ball lock clamp").

Figure 6:
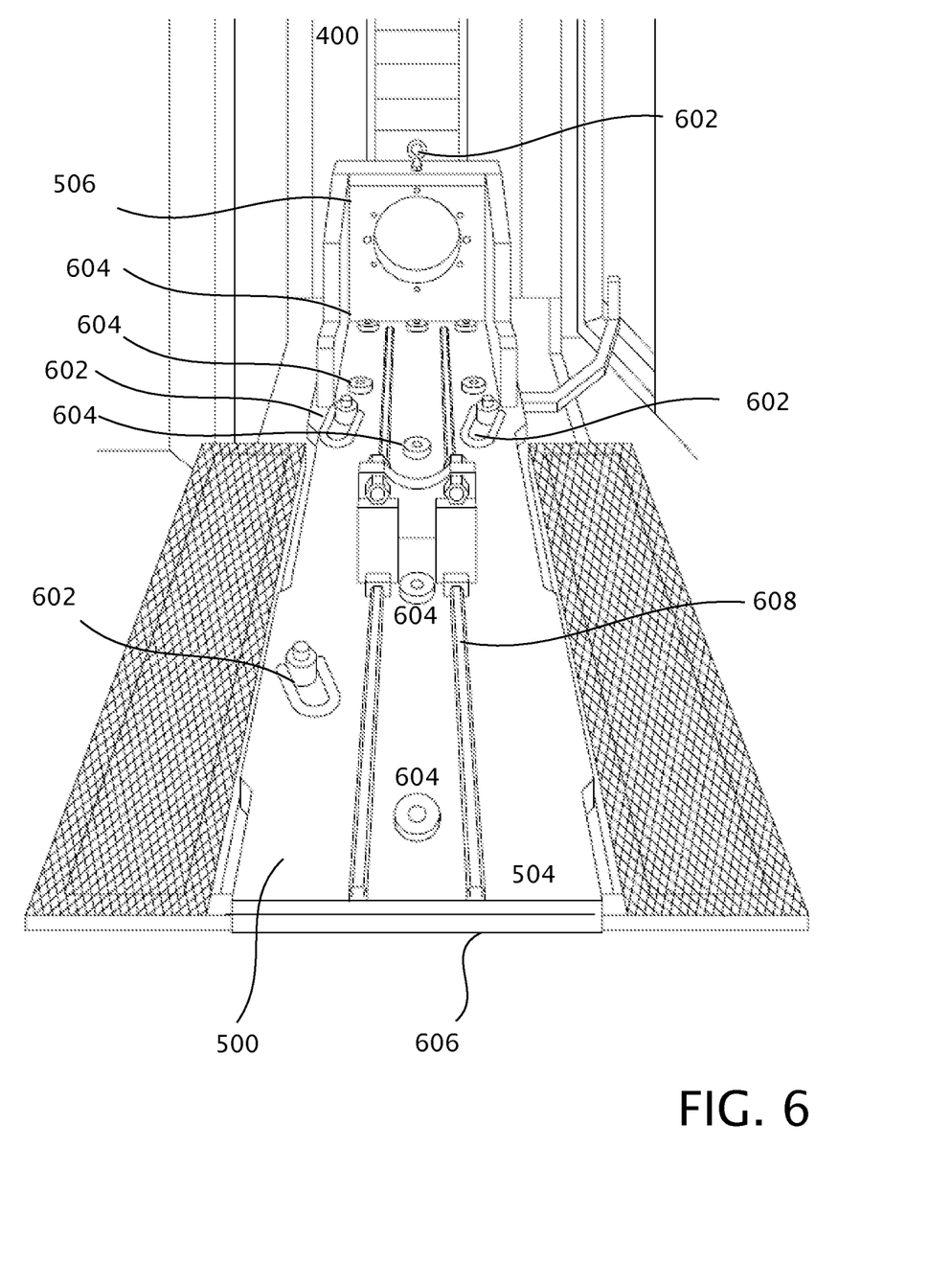
FIG. 6 shows an end view of the blade holding fixture used for precision taper bore reaming.

FIG. 6 shows an end view of the blade holding fixture 506 used for precision taper bore reaming installed in a milling machine. The blade holding fixture 506 is shown as positioned in the horizontal mill 400. It has dimensions of typically 62 inch long by 16 in wide by 17 inch high, using 1 to 2 inch plate steel, aluminum or equivalent. The plate 504 is held to the milling machine stage 606 by 4 to 8 CarrLock® Clamps or equivalent 604. Lifting eyes 602 and a linear carriage 608 make it easy to extract the blade from the horizontal mill.

Blade Alignment Fixture

Figure 7:
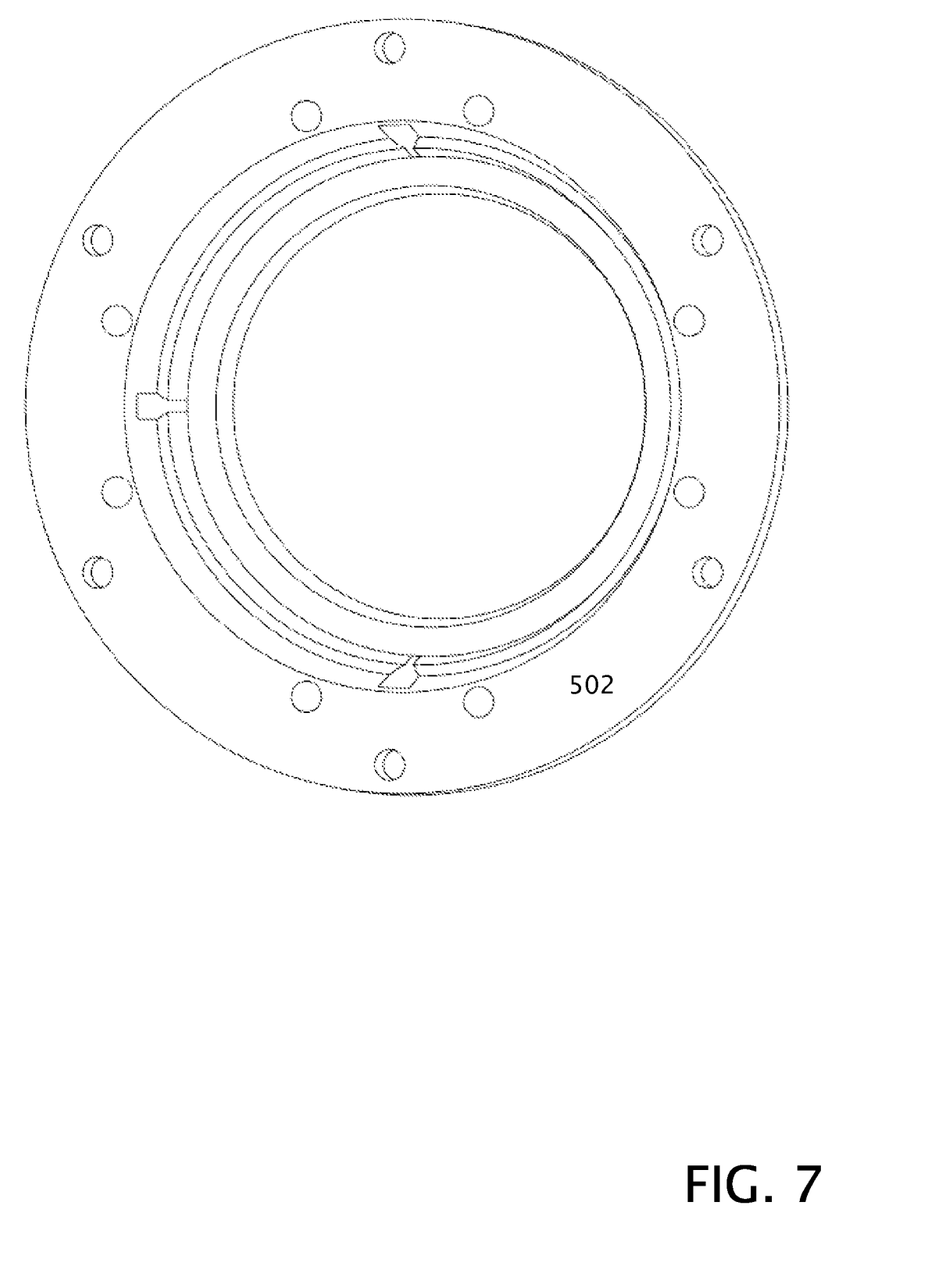
FIG. 7 shows a blade adaptor used for precision taper bore reaming.

FIG. 7 shows a blade adaptor 502 used for precision taper bore reaming. This is of a first side of the blade adapter 502, which is the side that will be facing the propeller blade (508 of FIG. 5) when the propeller blade is coupled to the finished blade alignment fixture (900 of FIG. 9). The blade adaptor 502 is attached (by threaded fasteners, welding or the like) to the blade holding fixture (506 of FIG. 5), and typically remains on the blade holding fixture (506 of FIG. 5) during use. The blade adapter 502 adapts the blade (508 of FIG. 5) to the blade holding fixture assembly (500 of FIG. 5). Clamping force is achieved by clamping on the blade thrust ring and the blade face. The purpose of this fixture design is to allow quick removal of the blade (508 of FIG. 5) from the blade holding fixture assembly (500 of FIG. 5) without having to remove the entire fixture assembly (500 of FIG. 5) for each propeller blade repair. This apparatus (500 of FIG. 5) greatly reduces operation time and maintains proper alignment of the blade (508 of FIG. 5) into the blade holding fixture assembly (500 of FIG. 5) via bull nose pins (802 of FIG. 8), or equivalent.

FIG. 8 shows an alignment plate 800 used for precision taper bore reaming. The blade alignment fixture (900 of FIG. 9) ensures proper orientation of the blade adaptor in the blade holding fixture. This is achieved by using an alignment plate 800 having pins 804 that mate with corresponding pin holes on the blade adapter fixture to align blade properly in the blade holding fixture. Pins 802 on the plate 800 are positioned to engage holes (208 of FIG. 2) on the flange face (210 of FIG. 2) of the propeller. Holes 806 may be spaced to match attachment points on the propeller (212 of FIG. 2) to accept fasteners.

Figure 9:
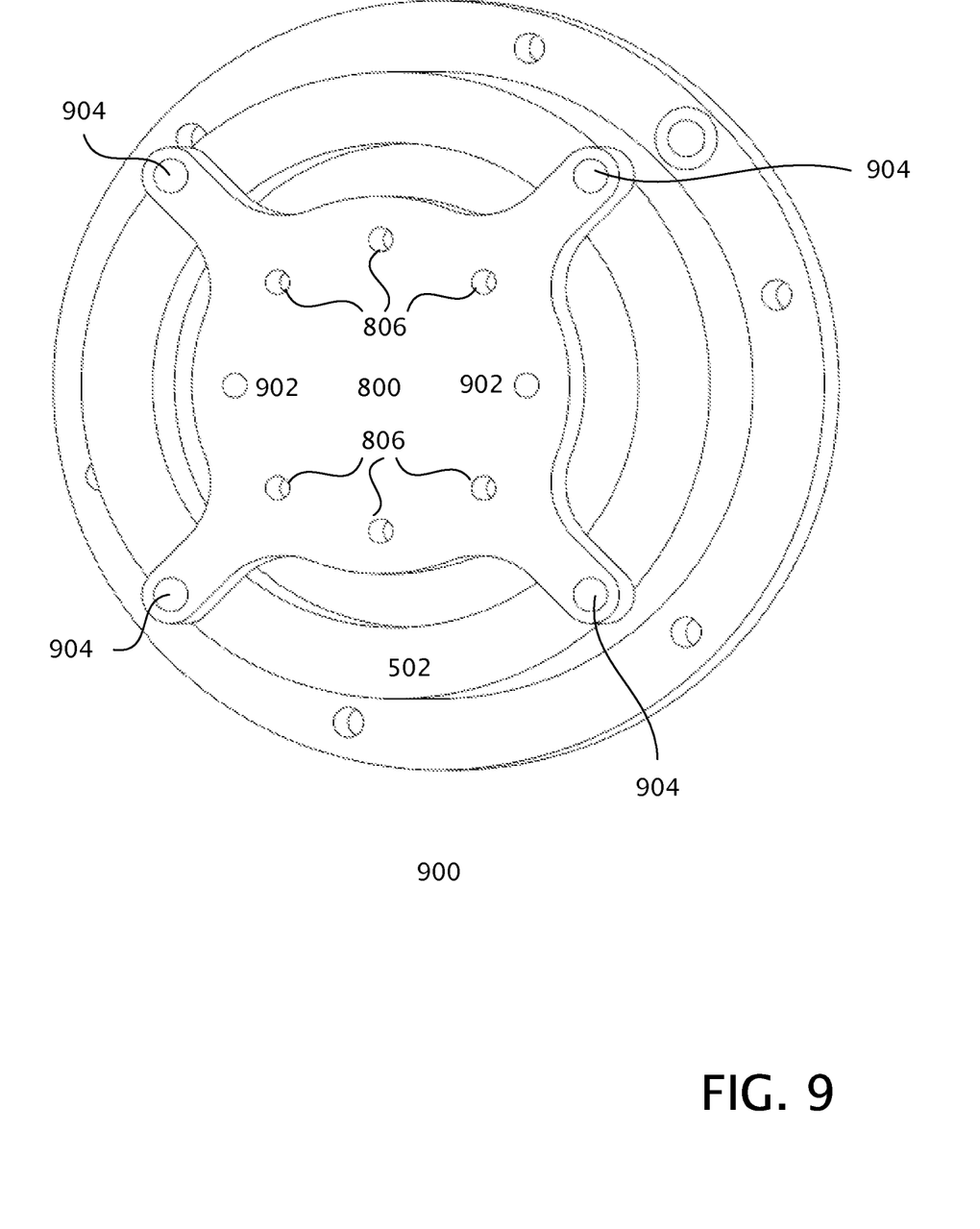
FIG. 9 shows a blade alignment fixture including the blade adapter and the alignment that is used in precision taper bore reaming.

FIG. 9 shows a blade alignment fixture 900 that includes the blade adapter 502 and the alignment plate 800 that is used in precision taper bore reaming. This view shows the second side of the adapter plate 502 generally facing away from the mounted propeller. A mounted propeller engages pins, the location of which is shown by circles, or the back side of the pins 902. Holes or apertures 806 allow clearance for threaded fasteners coupling the blade to the alignment plate 800. The alignment plate 800 includes pins (804 of FIG. 8), the back sides, or outlines of their location being shown by circles 904. The alignment plate 800 couples to and is positioned on the blade adapter 502 by the pins (804 of FIG. 8) engaging corresponding apertures in the blade adapter 502. Using the fixturing described above the blade may be positioned for refurbishment. Machining tools are typically equipped with computer guided tools to produce parts from raw stock. However in this case an existing part that may be Irregular in shape from wear is being reworked. Accordingly a system that measures an existing part to establish data points and guide cutting tools is called for.

Probing and Laser System

An integrated probing system (not shown) may be utilized for taper bore machining and reaming. Such probing systems can be used to identify and set-up parts, measure features in-cycle for adaptive machining, monitor work piece surface condition and verify finished component dimensions. An exemplary probing system is produced by Reneshaw Inc. of 1001 Wesemann Drive, West Dundee, Ill. 60118.

The probing system is programmed by methods known to those skilled in the art to appropriately locate the blade in the x, y, and z coordinates and find the orientation position of the blade, so as to reorientation the horizontal mill coordinate system to align with the blade position.

The integrated laser system is designed by methods known to those skilled in the art to measure tooling and automatically create machine offsets to allow machining and reaming operations to be accurate and repeatable.

Reaming

To machine the blade taper bore two types of invented reamers are used to ream the bushing taper bore (204 of FIG. 2) and the lead wool taper bore (202 of FIG. 2) of the blade. The invented reamers (of FIGS. 10 and 11) are custom made, where the number of spiral flutes, the degree of twist of flute, and cut angle of the reamer are made to quickly cut the materials. The design of the reamers is executed by methods known to those skilled in the art to provide a desired finish utilizing the milling machine described above.

Figure 10:
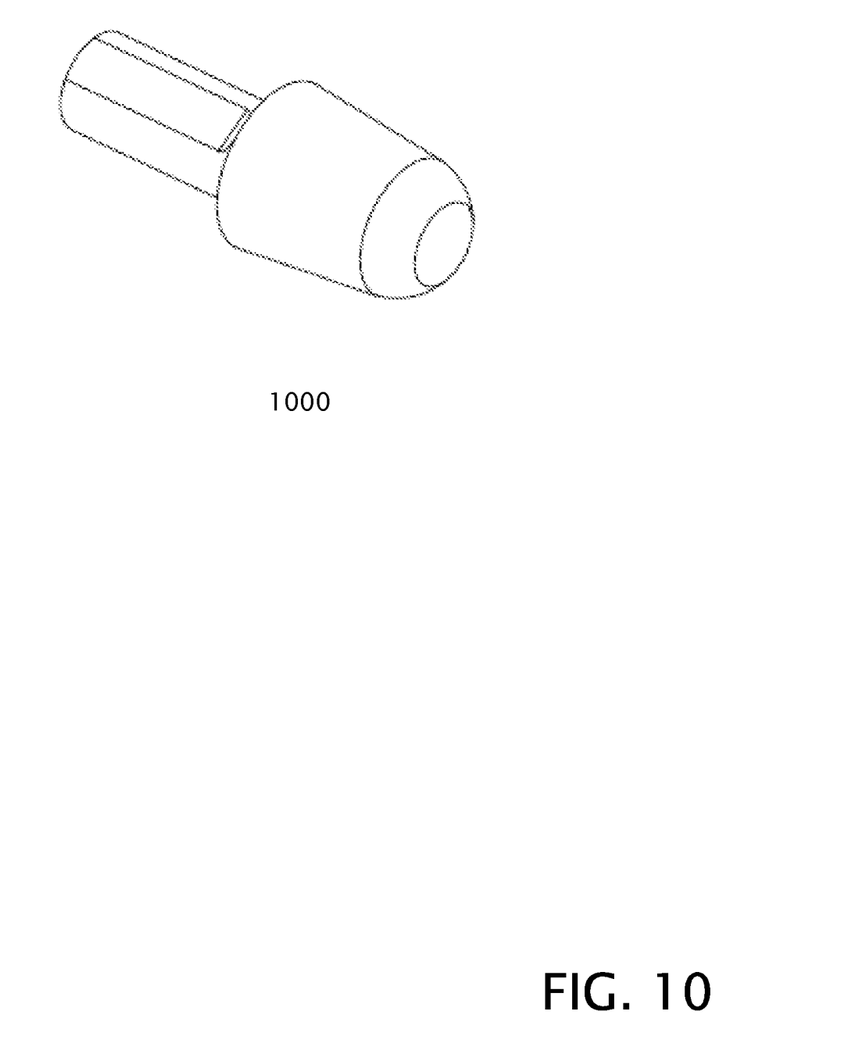
FIG. 10 shows a bushing taper bore reamer used for precision taper bore reaming.

FIG. 10 shows a bushing taper bore reamer 1000 used for precision taper bore reaming. The bushing taper reamers 1000 are designed as a set. The set includes one pre-shot peen and one post-shot peen reamer. Each reamer has 6 to 12 left hand cutting spiral flutes and provides for right hand cutting. The spiral and cut direction could be reverse and work the same.

Figure 11:
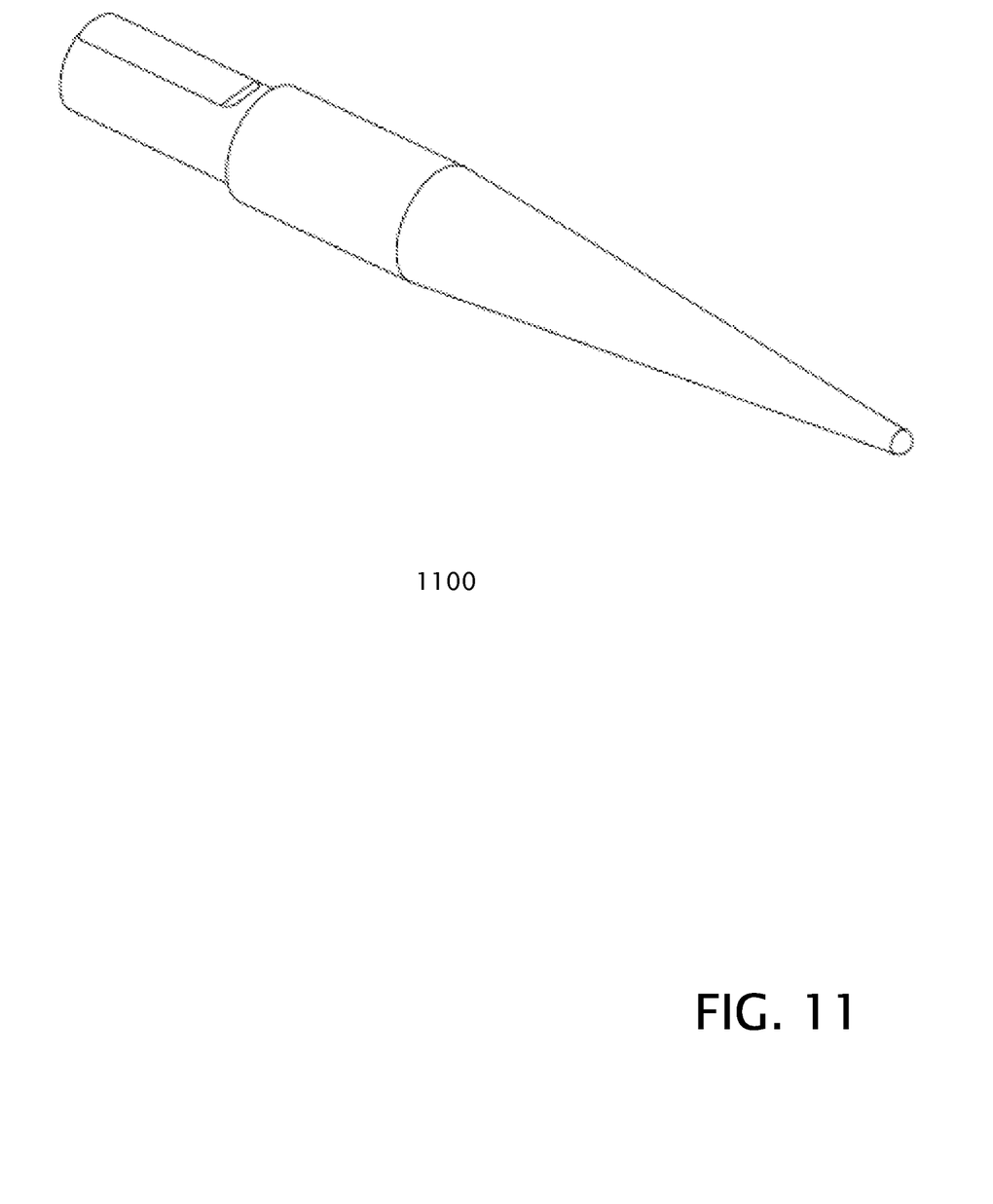
FIG. 11 shows a lead wool taper reamer used for precision taper bore reaming.

FIG. 11 shows a lead wool taper reamer 1100 used for precision taper bore reaming. The lead wool taper bore reamer 1100 is a single reamer that reams the entire taper bore in one operation. The reamer 1100 has 3 to 6 flutes that are left or right hand spiral with left or right hand cut. With this design it is possible to ream the taper bores in single plunging operation. This tooling design makes the reaming process quick as compared to using two reamers, as there is no post work of cleaning up the transition between two reamers.

Air Gauge Measurement of the Taper Bore

Figure 12:
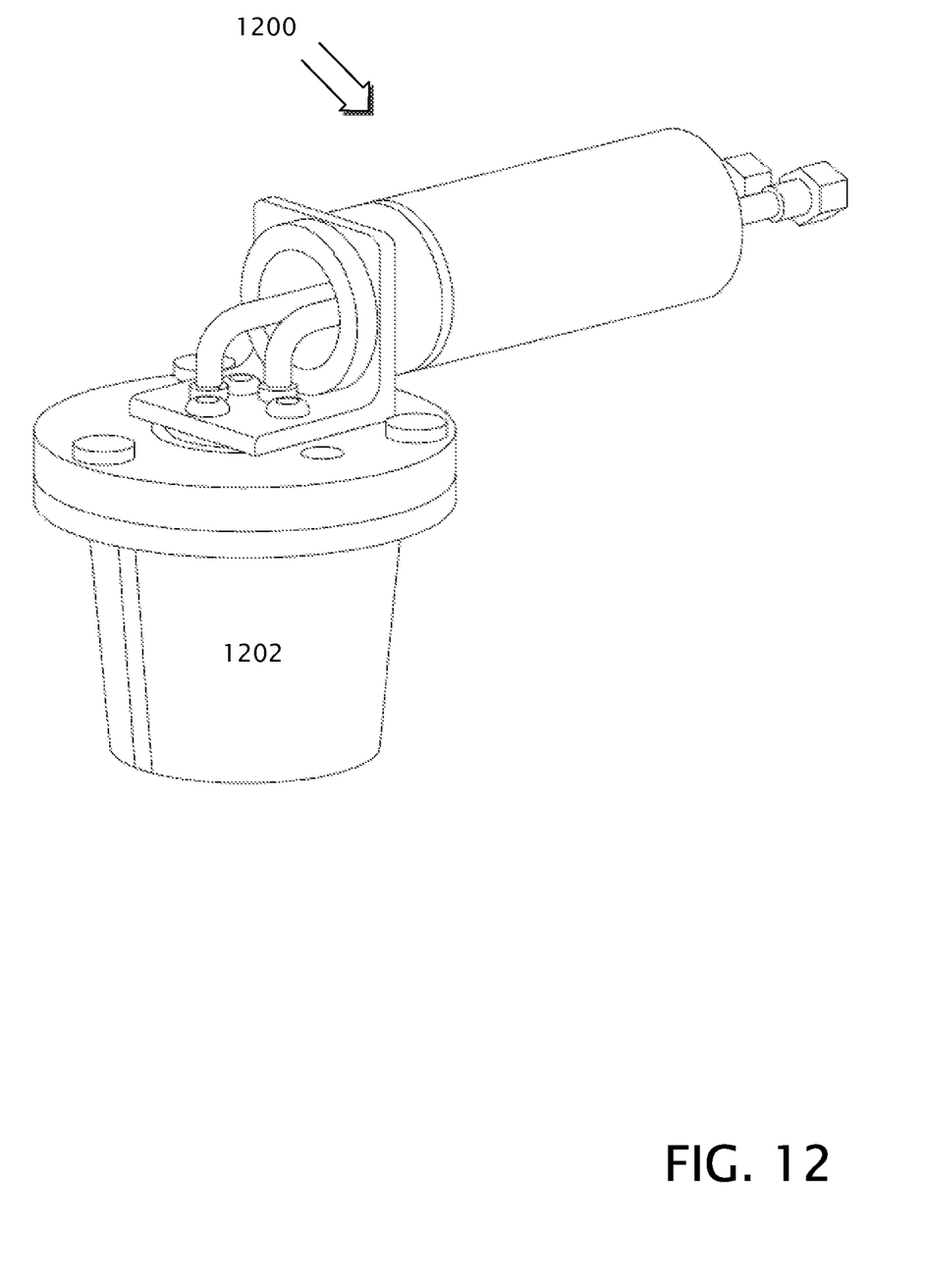
FIG. 12 shows an air gauge used for precision taper bore reaming.

FIG. 12 shows an air gauge 1200 used for precision taper bore reaming. The tapered air gauge 1200 is used in the reaming process. The tapered air gauge 1200 is a made by methods known to those skilled in the art of inspection tooling used to measure the bushing taper bore gauge diameter, gauge diameter location, and taper angle. The air gauge 1200 comes with a precision ground taper plug (not shown), that incorporates 4 to 8 air nozzle (not shown) for measurement of the taper diameters at each port location, a handle (not shown) for holding the air gauge, a digital display (not shown) for reading the gauge diameter, and comes with a master ring (not shown), which represents the perfect bushing taper bore.

The air gauge 1200 works by monitoring backpressure of the air at the nozzles. When the taper plug with built in nozzles 1202 is inserted into the master ring, the master rings walls get very close to the opening of the air nozzle and restricts the airflow. The restriction of airflow causes an increase in back pressure. This increase in back pressure is then read by a pressure transducer in the digital display and converted to a numerical readout for the operator read.

The tapered air gauge is calibrated to the master ring prior to inspection of the taper bore. After the air gauge is calibrated, it is inserted into the blade taper bore needing measurement. With air gauge tooling, it is possible to quickly measure a taper bore for proper dimensions on 100% of the blades being machined and reamed.

The current method used to measure blade taper bores is by using a Coordinate Measurement Machine ("CMM"). A CMM requires a lot of time dedicated to setup and qualification of the CMM program, a lot of training to operate a CMM, requires a climate controlled room, very expensive to operate, and can't measure the blade while it is still in the machine. Using a CMM typically requires a lot of time to get a taper bore measurement and if a rework is typically required, additional time to reload blade for additional machining is typically required. An air gauge on the other hand has very easy setup, requires little training, measures precise, cheap compare to a CMM, and can measure every blade while the blade is in the machine.

Fluorescent Penetrant

Figure 13:
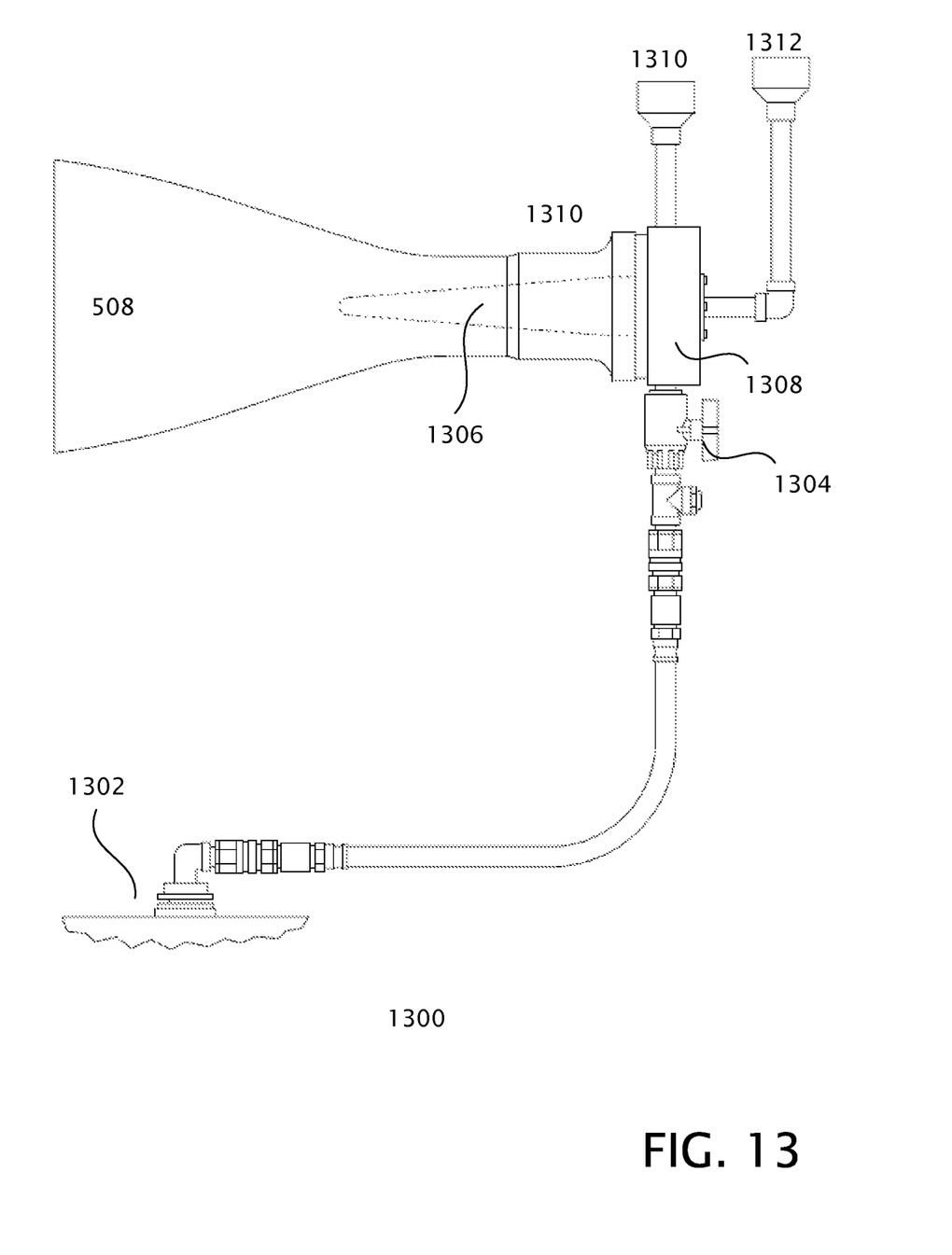
FIG. 13 shows a fluorescent penetrant emersion fixture used for precision taper bore reaming.

FIG. 13 shows a fluorescent penetrant emersion fixture 1300 used for precision taper bore reaming. The HS SK drawings repair process requires fluorescent penetrant inspection of the taper bore. Fluorescent penetrant inspection ("FPI") is a process that is used to look for cracks, corrosion pits, or other questionable surface indications. The process uses a special fluorescent liquid known to those skilled in the art, emulsifier, developer, and a black light. The part is immersed in the fluorescent liquid for full coverage. The part is dwelled for a required time and washed with an emulsifier. Then a developer is applied and dried. Afterwards the part is examined under a black light to look for cracks and other indications that fluoresce.

The HS SK requires the blade taper bore to be fully immersed with fluorescent penetrant. The reason for immersion is because the area inside the taper bore can be difficult to access and verify full coverage with fluorescent penetrant. Standard industry practice for this operation would be to purchase a tank and fully submerge the entire blade in penetrant. Installing such equipment requires a major infrastructure upgrade and tends to be wasteful as only the interior surface is of concern.

To eliminate the infrastructure upgrade a unique fixture and a method to fully immerse the blade taper bore by use of an invented taper bore cap 1308 has been developed. The cap is affixed to the blade shank end 1310 of the blade 508 via the blade bushing screw holes in the blade. Porting features 1310 1312 are designed into the cap 1308 to allow gravity feed or pressurized fluorescent penetrant, emulsifier, or developer to fill the taper bore 1306. The port 1312 that is positioned higher (than the other port 1310) is a fill port. The lower port 1310 is used to judge that the taper bore 1306 is full when fluid is visible in its top. The taper bore is then drained via drain valve 1304 and captured into a storage container 1302.

1. A method for refurbishment of an aircraft propeller blade comprising:
   loading an aircraft propeller blade onto a blade holding fixture on a horizontal mill;

skim cutting a but face of the aircraft propeller blade;
reaming shot peening from a bushing taper bore and a lead wool taper bore;
measuring for a first time the bushing taper bore with an air gauge;
performing a non destructive inspection of the bushing taper bore and the lead wool taper bore;
shot peening the bushing taper bore and the lead wool taper bore; and
measuring for a second time the bushing taper bore with the air gauge.

2. The method of claim 1 further comprising running a probe cycle.

3. The method of claim 2 in which running a probe cycle includes locating the aircraft propeller blade in x, y, and z coordinates and finding an orientation position of the aircraft propeller blade, causing reorientation of a horizontal mill coordinate system to align with an aircraft propeller blade position.

4. The method of claim 1 further comprising finish reaming of the bushing taper bore.

5. The method of claim 1 in which non-destructive testing includes eddy current inspection of the taper bore.

6. The method of claim 1 in which non-destructive testing includes fluorescent inspection of the taper bore.

7. The method of claim 6 in which fluorescent inspection is prepared without immersing the aircraft propeller in a tank of fluorescent penetrant.

8. The method of claim 6 further comprising preparation for fluorescent inspection by applying fluorescent penetrant with a fluorescent penetrant emersion fixture.

9. The method of claim 1 in which the blade holding fixture includes a blade adapter fixture with alignment pins allowing quick removal of the aircraft propeller blade.

10. A system for refurbishing an aircraft propeller blade comprising:
a horizontal mill with a machining stage;
a blade holding fixture assembly holding the aircraft propeller blade and secured to the machining stage; and
a probing system for measuring a position of a set of datum points on the propeller blade.

11. The system for refurbishing an aircraft propeller blade of claim 10 in which the blade holding fixture includes a blade alignment fixture.

12. The system for refurbishing an aircraft propeller blade of claim 11 in which the blade alignment fixture includes:
a blade adapter; and
an alignment plate coupled to the blade adapter.

13. The system for refurbishing an aircraft propeller blade of claim 12 in which the aircraft propeller is coupled to the alignment plate.

14. The system for refurbishing an aircraft propeller blade of claim 10 in which the blade holding fixture includes a linear carriage.

15. The system for refurbishing an aircraft propeller blade of claim 10 further comprising a fluorescent penetrant emersion fixture.

16. The system for refurbishing an aircraft propeller blade of claim 10 further comprising an air gauge.

17. The system for refurbishing an aircraft propeller blade of claim 10 further comprising a lead wool taper reamer.

18. The system for refurbishing an aircraft propeller blade of claim 10 further comprising a bushing taper bore reamer.

19. A system for refurbishment of an aircraft propeller blade comprising:
a fixturing means for loading an aircraft propeller blade onto a horizontal mill;
a reaming means for removing a shot peening from a bushing taper bore and a lead wool taper bore;
an air gauge measuring means for measuring the bushing taper bore:
a nondestructive testing means for performing a non destructive inspection of the bushing taper bore and the lead wool taper bore; and
a shot peening means for shot peening the bushing taper bore and the lead wool taper bore.

20. The system for refurbishment of an aircraft propeller blade of claim 19 in which the nondestructive testing means includes a fluorescent penetrant emersion fixture for applying a fluorescent penetrant to a taper bore.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A method for refurbishment of an aircraft propeller blade comprising:
loading an aircraft propeller blade onto a blade holding fixture on a horizontal mill;
skim cutting a butt face of the aircraft propeller blade;
reaming shot peening from a bushing taper bore and a lead wool taper bore;
measuring for a first time the bushing taper bore with an air gauge;
performing a non destructive inspection of the bushing taper bore and the lead wool taper bore;
shot peening the bushing taper bore and the lead wool taper bore; and
measuring for a second time the bushing taper bore with the air gauge.

2. The method of claim 1 further comprising running a probe cycle.

3. The method of claim 2 in which running a probe cycle includes locating the aircraft propeller blade in x, y, and z coordinates and finding an orientation position of the aircraft propeller blade, causing reorientation of a horizontal mill coordinate system to align with an aircraft propeller blade position.

4. The method of claim 1 further comprising finish reaming of the bushing taper bore.

5. The method of claim 1 in which non-destructive testing includes eddy current inspection of the taper bore.

6. The method of claim 1 in which non-destructive testing includes fluorescent inspection of the taper bore.

7. The method of claim 6 in which fluorescent inspection is prepared without immersing the aircraft propeller in a tank of fluorescent penetrant.

8. The method of claim 6 further comprising preparation for fluorescent inspection by applying fluorescent penetrant with a fluorescent penetrant emersion fixture.

9. The method of claim 1 in which the blade holding fixture includes a blade adapter fixture with alignment pins allowing quick removal of the aircraft propeller blade.

* * * * *